US011684996B2

(12) United States Patent
Brun et al.

(10) Patent No.: US 11,684,996 B2
(45) Date of Patent: Jun. 27, 2023

(54) SINGLE-SIDED WELDING HEAD

(71) Applicant: C.R.F. Società Consortile per Azioni, Orbassano (IT)

(72) Inventors: Rosanna Brun, Orbassano (IT); Elisa Micucci, Orbassano (IT); Stefano Tateo, Turin (IT); Massimo Gattabria, Grugliasco (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 876 days.

(21) Appl. No.: 16/682,478

(22) Filed: Nov. 13, 2019

(65) Prior Publication Data

US 2020/0156180 A1 May 21, 2020

(30) Foreign Application Priority Data

Nov. 16, 2018 (EP) .................................. 18206676

(51) Int. Cl.
| | |
|---|---|
| *B23K 11/30* | (2006.01) |
| *B23K 11/093* | (2006.01) |
| *B23K 11/31* | (2006.01) |
| *B25J 15/00* | (2006.01) |
| *B23K 101/00* | (2006.01) |

(52) U.S. Cl.
CPC ........ *B23K 11/3027* (2013.01); *B23K 11/093* (2013.01); *B23K 11/311* (2013.01); *B23K 11/312* (2013.01); *B23K 11/318* (2013.01); *B25J 15/0019* (2013.01); *B23K 2101/006* (2018.08)

(58) Field of Classification Search
CPC ... B23K 11/093; B23K 11/11; B23K 11/3027; B23K 11/311; B23K 11/312; B23K 11/318; B23K 2101/006; B23K 11/31; B25J 15/0019

USPC ........................................................ 219/86.9
See application file for complete search history.

(56) References Cited

U.S. PATENT DOCUMENTS 9,759,612 B2 * 9/2017 Song .................... B23K 11/314
2003/0222054 A1 * 12/2003 Katou .................... B23K 11/11
219/86.9

(Continued)

FOREIGN PATENT DOCUMENTS

| JP | 2002263848 A | 9/2002 |
|---|---|---|
| JP | 2013169590 A | 9/2013 |
| KR | 1020140117141 A | 10/2014 |

OTHER PUBLICATIONS

European Search Report dated May 21, 2019. 3 pages.

*Primary Examiner* — Dana Ross
*Assistant Examiner* — James F Sims, III
(74) *Attorney, Agent, or Firm* — RMCK Law Group PLC

(57) ABSTRACT

Described herein is a single-sided welding head including a first welding electrode and a second welding electrode, where the first and second welding electrodes are carried by a body of said welding head. The first welding electrode is movable relative to the body of said welding head at least along a first coordinate of motion. The second welding electrode is movable relative to the body of said welding head at least along a second coordinate of motion; where said first coordinate of motion is a coordinate of angular motion that develops about a first axis of rotation, and said second coordinate of motion is a coordinate of linear motion that develops along a first axis of translation.

14 Claims, 4 Drawing Sheets

(56) References Cited

U.S. PATENT DOCUMENTS

2012/0067851 A1    3/2012  Lee
2015/0346033 A1*  12/2015  Song ........................ B23K 11/11
                                                                                 219/78.01
2018/0236594 A1*  8/2018  Gattabria ............. B23K 11/315

* cited by examiner

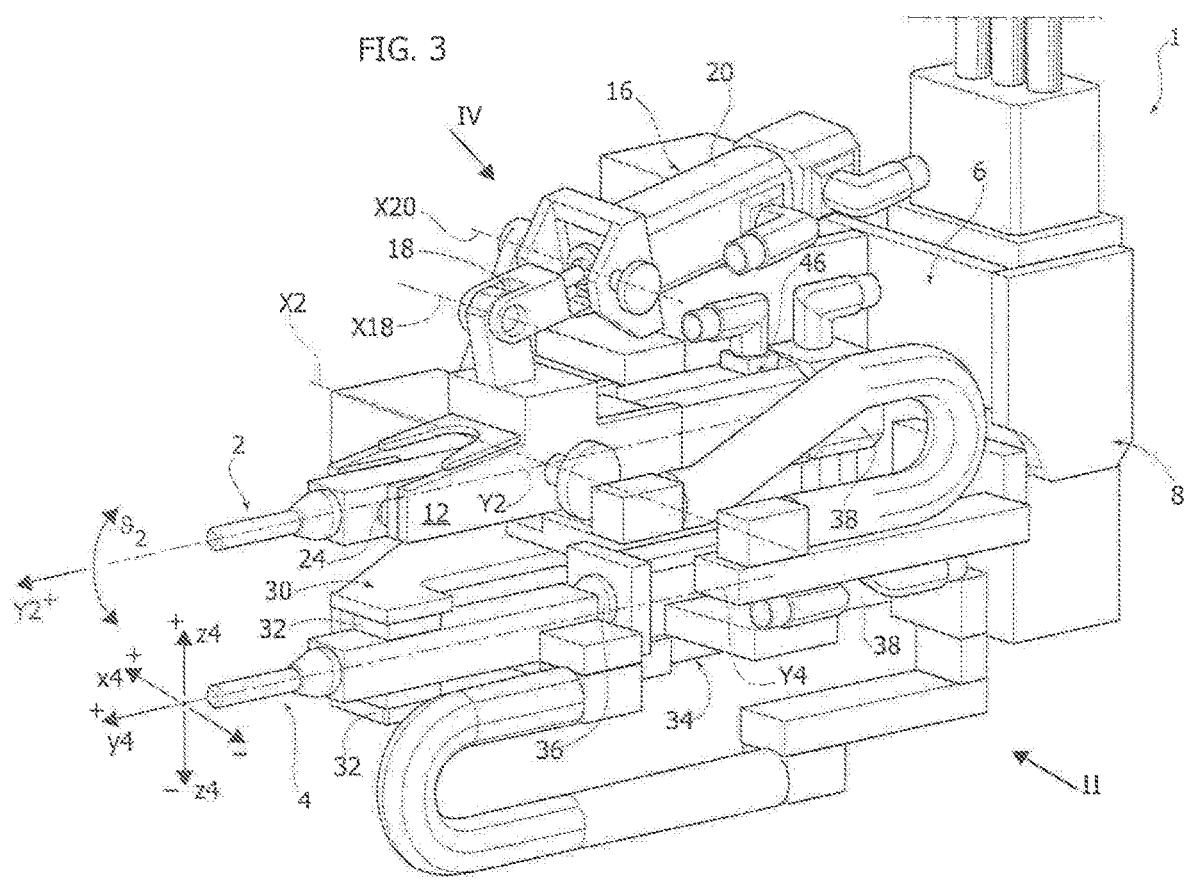

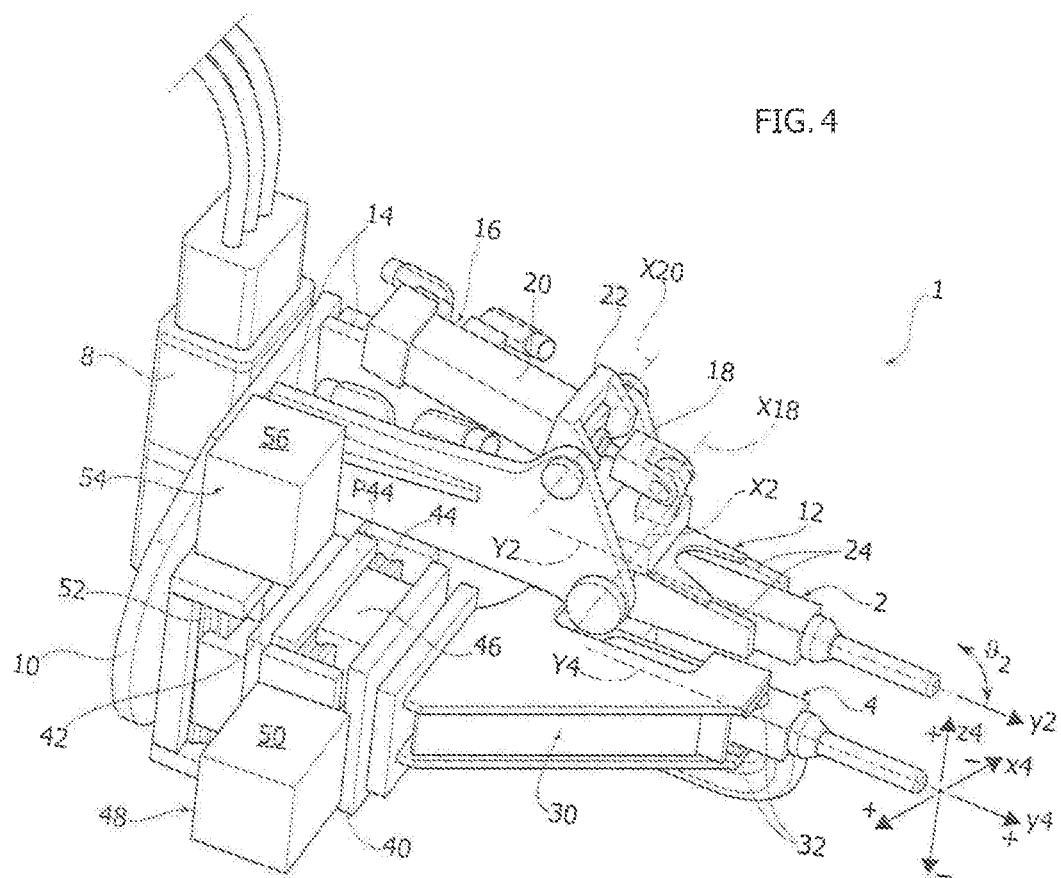

SINGLE-SIDED WELDING HEAD

CROSS-REFERENCE TO RELATED APPLICATION

This application claims priority to European Patent Application No. 18 206 676.1 filed Nov. 16, 2018. The disclosure of the above application is incorporated herein by reference in its entirety.

FIELD OF THE INVENTION

The present invention relates to single-sided welding heads. In particular, the invention has been developed with reference to a single-sided welding head with mobile electrodes.

PRIOR ART AND GENERAL TECHNICAL PROBLEM

The technological background of reference of the invention forming the subject of the present patent application numbers some examples of single-sided welding heads with electrodes that are substantially fixed or at the most with the possibility of only axial movement and some examples of single-sided welding heads in which an electrode has a component of transverse movement.

All the solutions available in the framework of the prior art are from various standpoints unsatisfactory from the operative point of view, primarily on account of the limited range of joints on which they can operate. In greater detail, a single-sided welding head has both of the electrodes (the ground electrode and the active electrode) set alongside one another so as to be on the same side of the ensemble of metal sheets that are to be welded. This makes it possible to operate on some types of joints on which it would be impracticable to carry out welding using a jaw welding head, at the cost, however, of having to adapt, to a varying extent, to the geometry of the joint itself. A first reason underlying the above drawback lies in the fact that in a joint made between two metal sheets, the ground electrode and the active electrode must each be in contact with a distinct metal sheet for the electrical welding process to be carried out. If the geometry of the joint is such that the interaxis distance between the electrodes does not make it possible to carry out the required positioning, the joint is simply not weldable.

Considering the case of a motor vehicle, there are then some types of joints that simply cannot be made by single-sided welding heads of a known type since they present a geometrical singularity (a hump, a projection, or else a channel) that is not compatible with the orientation of the electrodes on the welding head and/or would require a substantial modification of the sheet metal involved in the welding operation for the sole purpose of being able to position the electrodes of the single-sided welding head in a functionally acceptable way.

Irrespective of possible technological constraints that may exist as regards modification of some metal sheets, it is necessary to bear in mind that the operation is not always possible at sustainable costs in so far as the modification of some metal sheets would easily lead to redesign of the equipment for handling the sheet metal itself, as well as of other production-line infrastructures.

OBJECT OF THE INVENTION

The object of the present invention is to solve the technical problems mentioned previously. In particular, the object of the invention is to provide a single-sided welding head that can operate on a range of joints between metal sheets that is as wide as possible, in particular in the automotive field.

SUMMARY OF THE INVENTION

The object of the present invention is achieved by a welding head having the features forming the subject of the ensuing claims, which constitute an integral part of the technical disclosure provided herein in relation to the invention.

BRIEF DESCRIPTION OF THE DRAWINGS

The invention will now be described with reference to the annexed drawings, which are provided purely by way of non-limiting example and in which:

FIG. 3 is a perspective view similar to that of FIG. 1 with some components removed for requirements of representation; and FIG. 4 is a perspective view according to the arrow IV of FIG. 1.

DETAILED DESCRIPTION

The reference number 1 in FIGS. 1 to 4 designates as a whole a single-sided welding head according to a preferred embodiment of the invention. As has been said, all the axes in FIGS. 1 to 4 are labelled with a compound reference that comprises, in the first position, a figure indicating the direction in which the axis is oriented (the reference is the cartesian triad X-Y-Z reproduced in all the figures) and, in the second position, a figure that constitutes a unique identifying number.

Figure 1:
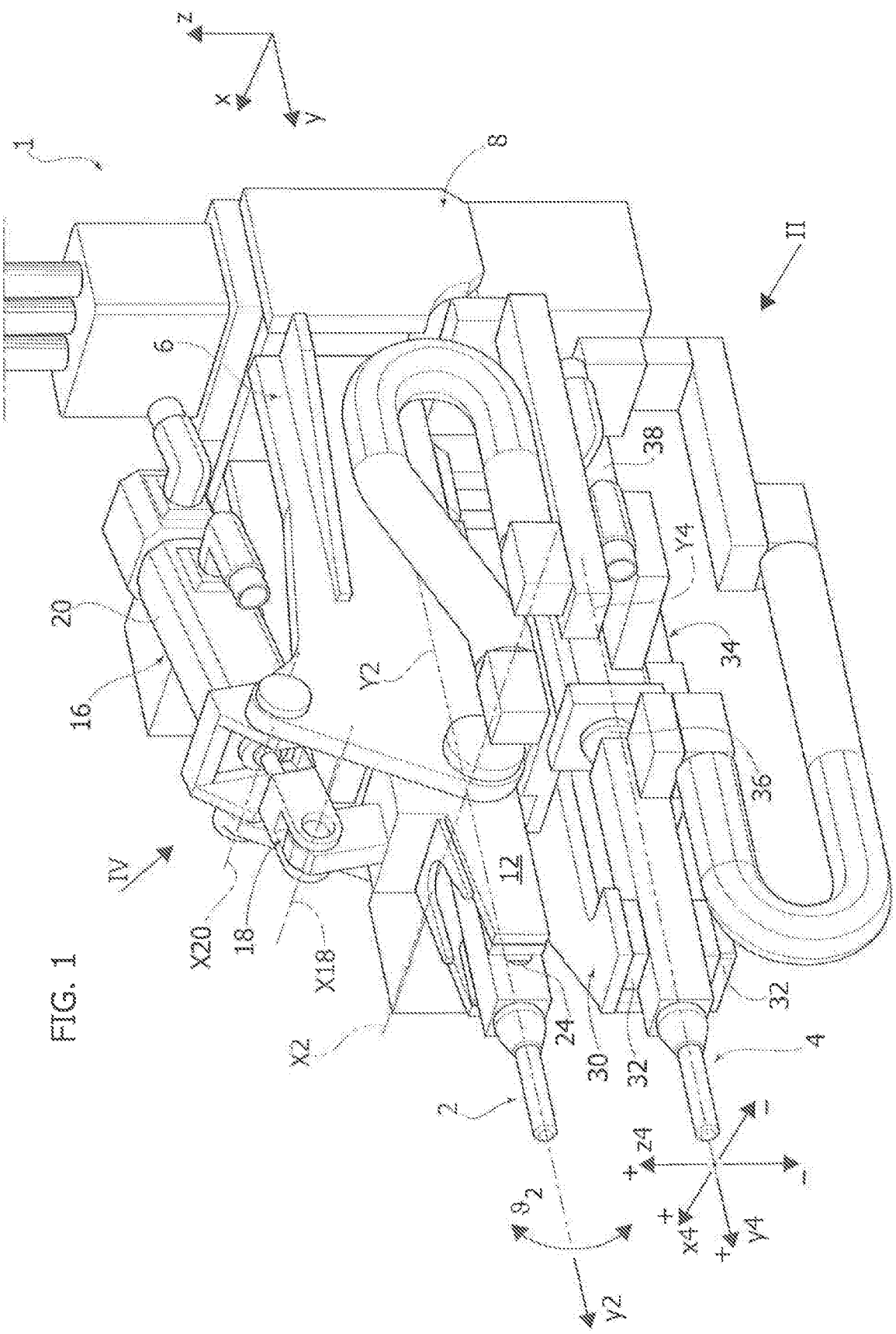
FIG. 1 is a perspective view of a welding head according to the invention.
Figure 2:
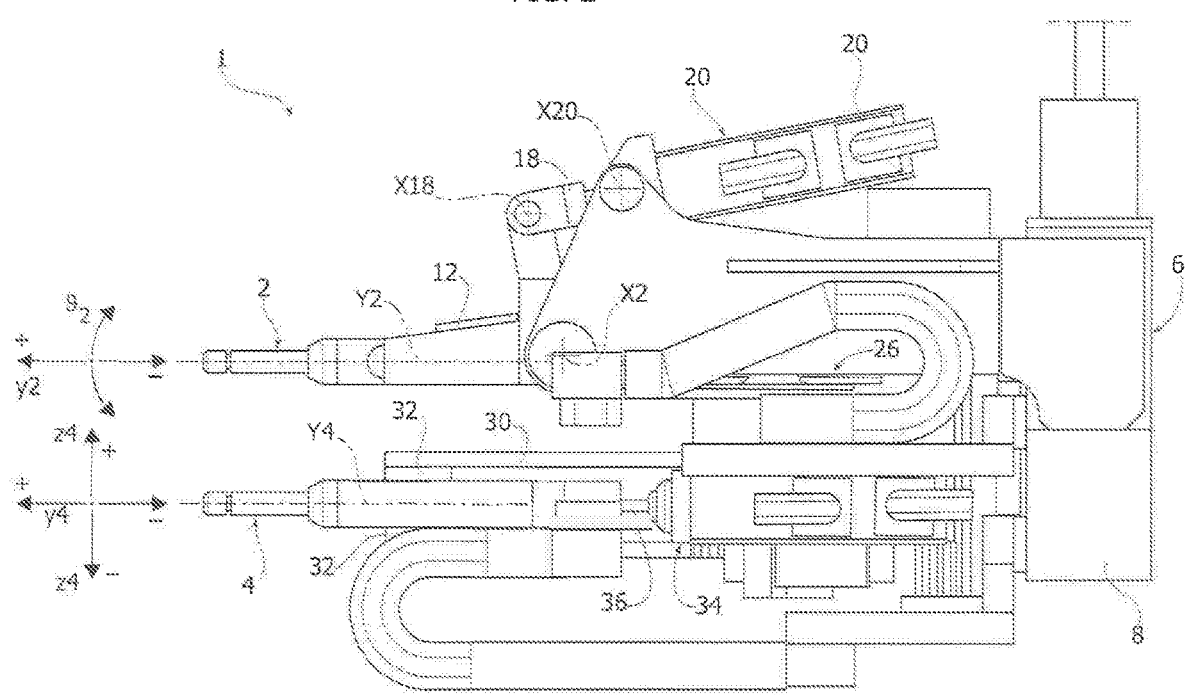
FIG. 2 is an orthogonal view according to the arrow II of FIG. 1.

With reference to FIG. 1, the welding head 1 comprises a first electrode 2 and a second electrode 4 carried by a body 6 of the welding head. The first electrode 2 is movable relative to the body 6 of the welding head 1 at least along a first co-ordinate of motion $\theta 2$ that is a co-ordinate of angular motion that develops about a first axis of rotation X2.

The second electrode 4 is, instead, movable relative to the body 6 of the welding head 1 at least along a second co-ordinate of motion X4 that corresponds to a co-ordinate of linear motion that develops along a first (and homonymous) axis of translation coinciding with the axis X and parallel to the axis X2.

Each of the electrodes 2, 4 is moreover movable along a third co-ordinate of motion Y2 and a fourth co-ordinate of motion Y4, respectively, which correspond to linear co-ordinates of motion that develop along respective homonymous longitudinal axes Y2, Y4 of the electrodes 2, 4.

The electrode 4 possesses, according to an advantageous aspect of the invention, yet a further degree of freedom that corresponds to the possibility of motion along a fifth co-ordinate of motion Z4 corresponding to a co-ordinate of linear motion that develops along a second (homonymous) axis of translation Z4 orthogonal to the axis of translation associated to the co-ordinate X4, which are both orthogonal to the longitudinal axis Y4 of the electrode 4.

Basically, whereas the electrode 2 has the possibility of rocking about the axis X2 and possibly, as in the embodiment illustrated herein, the possibility of advancing or receding axially with respect to a condition of zero regulation, the electrode 4 does not have any degrees of freedom along rotational co-ordinates of motion, but is able to perform linear displacements in the plane XZ. Of these, the movement along the first axis of translation X4 enables variation of the planar offset between the electrodes 2, 4, where by "offset" is meant a deviation from the condition of alignment of the electrodes in the plane ZY. In other words, if in the condition of zero regulation, the electrodes 2, 4 are aligned with respect to one another and contained in the plane ZY (and possibly aligned along the co-ordinate Y), with the regulation along the second co-ordinate of motion X4—and hence along the first axis of translation X4—the electrodes 2, 4 are carried in respective planes parallel to one another and parallel to the plane YZ. There will of course exist a plane that will contain both of the axes of the electrodes 2, 4, but this plane will not be parallel to any of the notable planes (XY, XZ, YZ) of the cartesian triad X-Y-Z.

The movement of the electrode 4 along the fifth co-ordinate of motion, and consequently along the second axis of translation Z4, enables, instead, variation of the distance (interaxis) between the electrodes 2, 4.

With reference once again to the representation of FIGS. 1 to 4, and in particular to the representation of FIG. 3, the body 6 of the welding head 1 comprises a head 8, on which there converge the electrical and/or fluidic power lines and which constitutes the interface with a wrist of an industrial robot that is designed to manipulate the head 1. Fixed to the head 8 is a supporting plate 10, fixed in turn to which are the moving elements that carry the electrodes 2, 4.

In particular, the electrode 2 is carried by a first cradle 12, which is connected in an articulated way to the body 6 of the welding head 1 about the axis of rotation X2, and in particular is connected in an articulated way to a pair of plates 14 that constitute a fork within which the cradle 12 is hinged to the axis X2 as hinge axis.

The cradle 12 is moreover connected in an articulated way to a first linear actuator 16, which comprises a first portion (here a stem) 18 and a second portion (here, as a result, a cylinder or a lining) 20 that are movable with respect to one another.

The first portion 18 is connected in an articulated way to the cradle 12 about an axis X18 parallel to the axis X2 and spaced therefrom by an arm necessary for governing rotation of the cradle 12 about the axis X2. The second portion 20 of the actuator 16 is, instead, connected in an articulated way to the fork defined by the plates 14 about an axis of rotation X20 parallel to the axes X2 and X18, preferably with interposition of a connection bracket 22.

The actuator 16 can be either of a pneumatic type or of an electromechanical type, the latter comprising, for example, a rotary electric motor that drives a nut, which engages a screw, which is in turn fixed to a stem of the actuator.

The cradle 12 in turn functions as guide for the electrode 2 in the movement along the respective longitudinal axis Y2. In particular, provided within the cradle 12 is a guide, preferably a prismatic guide 24 with respect to which the electrode 2 is slidably mounted along the longitudinal axis Y2, within which the electrode 2 is moved by means of a second linear actuator 26, preferably identical to the first linear actuator 16.

The actuator 26 comprises a first portion (here a stem) connected to the body of the electrode 2, and a second portion (here, as a result, a cylinder or lining) 28, which is fixedly connected to the cradle 12, with respect to which the stem is movable along the longitudinal axis of the electrode 2.

The entire actuator 26 moreover rocks about the axis X2 with the first electrode 2 when the cradle 12 is driven by the linear actuator 16 about the axis X2.

As regards the electrode 4, this is housed in a second cradle 30, within which the electrode 4 is slidably mounted along the respective longitudinal axis Y4.

For this purpose, a guide 32 is provided within the cradle 30 (preferentially this is a prismatic guide) and is configured for guiding the electrode 4 in the movement along the axis Y4 driven by a third linear actuator 34, which is preferentially identical to the actuators 16, 26. The linear actuator 34 comprises a first portion (here a stem) and a second portion (here, as a result, a lining or cylinder) movable with respect to one another, where a first portion 36 is connected to the electrode 4 whereas a second portion 38 is fixed within the body of the cradle 30 so that the relative movement of the first portion with respect to the second portion provides movement of the electrode 4 along the axis Y4.

Movement of the electrode 4 along the second and fifth co-ordinates of motion is provided by means of a first slide 40 and a second slide 42, respectively, which are both linearly movable along the second co-ordinate of motion X4 and the fifth co-ordinate of motion Z4, respectively, and in which the first slide 40 directly carries the cradle 30 and the electrode 4 and the actuator 34 therewith, whereas the second slide 42 carries the slide 40 and the corresponding motion assembly and drives them in motion globally along the fifth co-ordinate of motion Z4, also driving the cradle 30 and the electrode 4.

In greater detail, the first slide 40 is slidably mounted with respect to a first rectilinear guide 44 which is engaged by the slide 40, for example by means of one or more sliding blocks 46, providing a shape fit, and is driven along the second co-ordinate of motion X4 with respect to the guide 44 by means of a first motor-reducer assembly 48. The motor-reducer assembly 48 comprises a rotary electric motor 50 and a screw transmission, where the screw transmission includes a screw connected in rotation to the rotor of the rotary electric motor 50 and a nut fixed to the slide 40 and engaging the screw itself. Likewise, the second slide 42 is slidable with respect to a second rectilinear guide 52 orthogonal to the rectilinear guide 44 and is moved along it by means of a second motor-reducer assembly 54, which in turn comprises a rotary electric motor 56 and a screw transmission, where the screw transmission includes a screw connected in rotation to the rotor of the electric motor 56 and a nut fixed to the slide 42 and engaging the screw itself.

Connection between the cradle 30 and the slide 42 is obtained by way of the slide 40 of the respective moving element, in particular by interposition of a plate P44 fixed to the slide 42 and carrying the guide 44. Alternatively, the one or more profiles of the guide 44 can be provided mechanically directly on the plate 42.

During use, the welding head 1 enables variation of the relative position of the electrodes 2, 4 so as to adapt to a wide range of complex joint geometries that can be found in metal sheets of a motor vehicle.

Adjustment of the planar offset between electrodes (movement of the electrode 4 along the co-ordinate X4) of the distance between electrodes (movement of the electrode 4 along the co-ordinate Z4) and adjustment of the angle of incidence between the electrodes (movement of the electrode 2 along the co-ordinate θ2) enables, for example, welding of two overlapping metal sheets with a geometry that presents riliefs, tabs, or other types of surface geometrical singularities, such as the ones that may be found in the area of the tunnel on the floor of the body of a motor vehicle, or else again geometries that are found at the interface between the metal sheets of the uprights and the lower metal sheets of the body of the motor vehicle.

The range of geometries to which the head 1 can adapt is infinitely wider than what can be achieved with heads of a known type precisely thanks to the fact that there exists the possibility of rocking the electrode 2, which is typically the ground electrode, by varying the angle of incidence between the electrodes, and the possibility of varying the planar offset between the electrodes themselves.

The above possibilities of movement extend the range of geometries on which the head 1 can operate to such an extent as to render, in principle, optional the possibility of handling the electrodes 2 4, along the third co-ordinate of motion (Y2), the fourth co-ordinate of motion (Y4), and the fifth co-ordinate of motion (Z4), i.e., the two movements along the longitudinal axes and the interaxis variation.

In preferred embodiments, it is in any case in general chosen to implement—in addition to the movements along the first and second co-ordinates—one or more (better still all) of the movements relative to the third, fourth, and fifth co-ordinates. In particular, it is preferable to implement the variation of interaxis (fifth co-ordinate, Z4) in so far as it makes a favourable contribution to extending the range of joints that can be welded using the head 1.

Of course, the details of construction and the embodiments may vary widely with respect to what has been described and illustrated herein, without thereby departing from the scope of the present invention, as defined by the annexed claims.

What is claimed is:

1. A single-sided welding head, comprising:
   a first welding electrode and a second welding electrode, the first and second welding electrodes being carried by a body of said welding head, wherein:
      the first welding electrode having a first longitudinal axis and being movable relative to the body of said welding head at least along a first coordinate of motion;
      the second welding electrode having a second longitudinal axis and being movable relative to the body of said welding head at least along a second coordinate of motion;
      said first coordinate of motion is a coordinate of angular motion that develops about a first axis of rotation;
      said second coordinate of motion is a coordinate of linear motion that develops along a first axis of translation; and
      the first welding electrode is housed in a first cradle moveably connected to the body of said welding head about the first axis of rotation, said first cradle being moveably connected to a first portion of a first linear actuator, and wherein a second portion of said first linear actuator, movable relative to said first portion, is fixed to the body of said welding head.

2. The single-sided welding head according to claim 1, wherein the first welding electrode is movable along a third coordinate of motion, said third coordinate of motion being a coordinate of linear motion that develops along the first longitudinal axis of the first welding electrode.

3. The single-sided welding head according to claim 2, wherein the second welding electrode is movable along a fourth coordinate of motion, said fourth coordinate of motion being a coordinate of linear motion that develops along the second longitudinal axis of the second welding electrode.

4. The single-sided welding head according to claim 3, wherein said first axis of translation is orthogonal to the second longitudinal axis of the second welding electrode, and wherein said first axis of rotation is orthogonal to the first longitudinal axis of the first welding electrode.

5. The single-sided welding head according to claim 4, wherein the second welding electrode is movable along a fifth coordinate of motion, said fifth coordinate of motion is a coordinate of linear motion that develops along a third axis of translation orthogonal to the first axis of translation and orthogonal to the second longitudinal axis of the second electrode.

6. The single-sided welding head according to claim 1, wherein said first cradle further comprises a guide within which said first welding electrode is slidably mounted along the respective longitudinal axis, said first welding electrode being connected to a second linear actuator for motion along the respective longitudinal axis.

7. The single-sided welding head according to claim 6, wherein said second linear actuator is carried by said first cradle.

8. The single-sided welding head according to claim 1, comprising a second cradle in which said second welding electrode is slidably mounted along the respective longitudinal axis, said second welding electrode being moreover connected to a third linear actuator for movement along the respective longitudinal axis.

9. The single-sided welding head according to claim 8, wherein the second cradle is fixed to a first slide configured for enabling movement of said second welding electrode along the second coordinate of motion.

10. The single-sided welding head according to claim 5, wherein the first slide is slidable with respect to a first guide carried by a second slide, said second slide being linearly movable along the fifth coordinate of motion for enabling movement of the second welding electrode along it.

11. The single-sided welding head according to claim 10, wherein the second slide is slidable with respect to a second guide fixed to the body of said welding head.

12. The single-sided welding head according to claim 10, wherein said first slide is driven with respect to said first guide by a first motor-reducer assembly comprising a screw transmission.

13. The single-sided welding head according to claim 12, wherein said second slide is driven with respect to said second guide by a second motor-reducer assembly comprising a screw transmission.

14. The single-sided welding head according to claim 13, wherein the screw transmission of each of said first motor-reducer assembly and second motor-reducer assembly comprises a screw connected in rotation to a rotor of an electric motor, and a nut fixed to the corresponding slide and engaging the respective screw.

* * * * *